Figure 1:
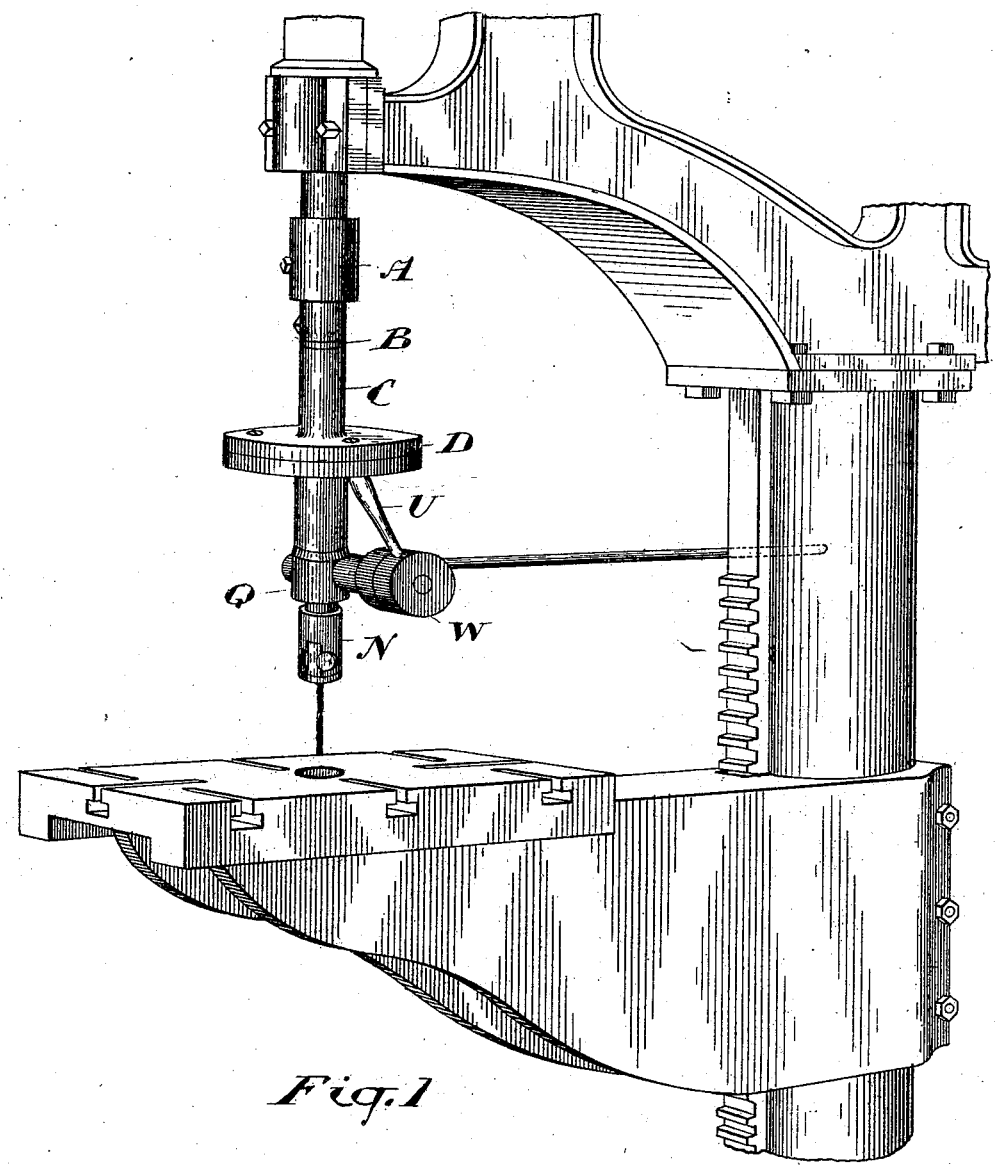

(No Model.)  2 Sheets—Sheet 1.

J. J. STEVENS.
ATTACHMENT FOR DRILLING MACHINES.

No. 503,012. Patented Aug. 8, 1893.

Witnesses
W. J. McMillan
J. Edw. Maybee

Inventor
John J. Stevens
by Donald C. Ridout & Co.
attys (No Model.) 2 Sheets—Sheet 2.
J. J. STEVENS.
ATTACHMENT FOR DRILLING MACHINES.
No. 503,012. Patented Aug. 8, 1893.
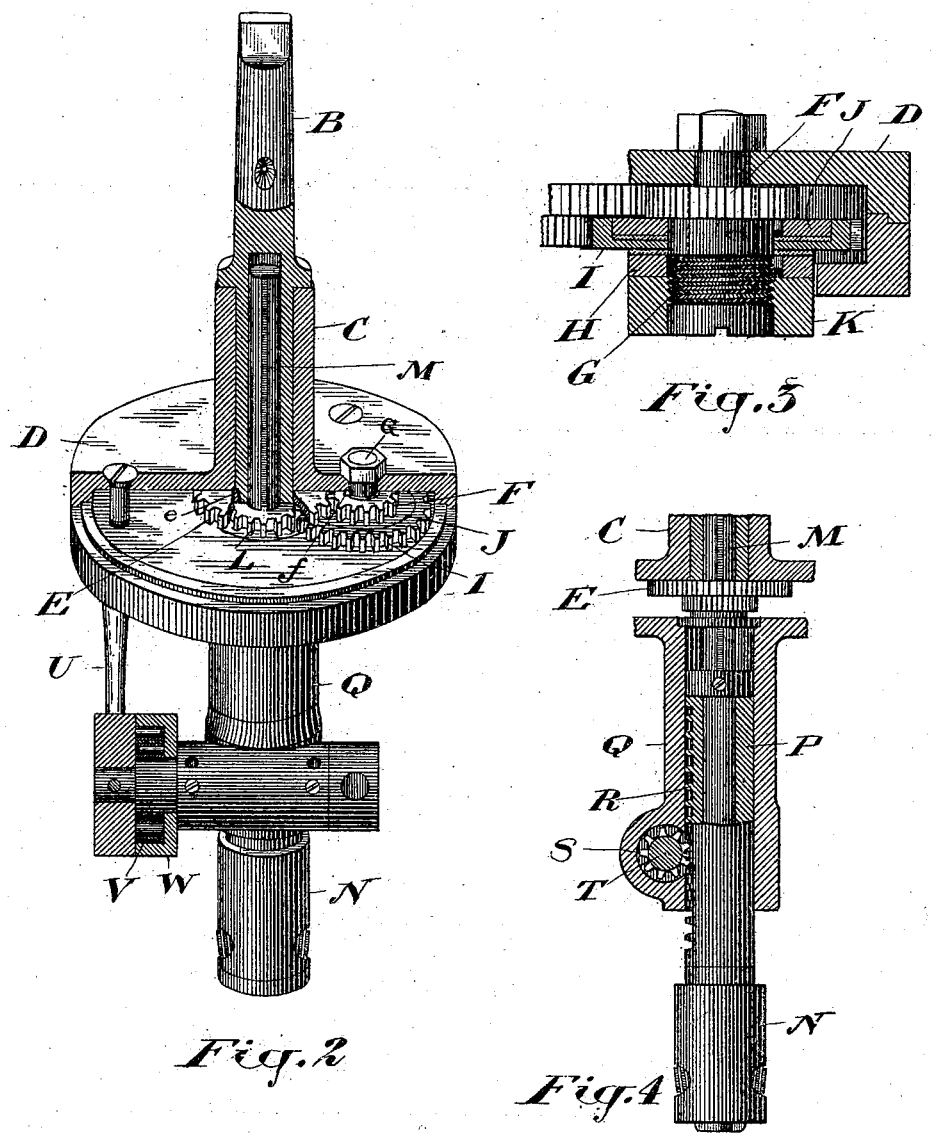
Witnesses
W. J. McMillan
J. Edw. Maybee
Inventor
John J. Stevens
by Donald C. Ridout & Co
Attys.

UNITED STATES PATENT OFFICE.

JOHN J. STEVENS, OF GALT, CANADA.

ATTACHMENT FOR DRILLING-MACHINES.

SPECIFICATION forming part of Letters Patent No. 503,012, dated August 8, 1893.

Application filed November 25, 1892. Serial No. 453,002. (No model.)

*To all whom it may concern:*

Be it known that I, JOHN JAMES STEVENS, of the town of Galt, in the county of Waterloo, in the Province of Ontario, Canada, have invented a certain new and Improved Attachment by which Small Drills may be Advantageously Used in a Large Drilling-Machine, of which the following is a specification.

The object of the invention is to provide an attachment by which small drills may be advantageously used in a large drilling machine, and it consists of a head in which a spindle fitted to the spindle of the drilling machine is journaled and geared within a head to a spindle designed to carry the small drill; substantially as and for the purpose hereinafter explained, and then definitely claimed.

In the accompanying drawings, Figure 1, is a perspective view showing a portion of a large drilling machine with my drill head attached. Fig. 2, is a perspective view partially in section of my improved drill-head. Fig. 3, is a detail of a portion of the gearing arranged in the head. Fig. 4, is a sectional view of the small drill spindle and gearing for adjusting it longitudinally.

In shops where only a large drilling machine is in use, it is practically impossible without some means, such as my device, to use small drills in the large drilling machines, as the speed necessary for the small drills cannot be secured in the large machines without causing them to shake to such an extent as to break the small drills. By the adoption of my device, I can secure as high a speed as desired for the spindle carrying the small drill without unduly racking the large drilling machine.

A, represents the spindle of the ordinary drilling machine into which the spindle B, is inserted. This latter spindle is journaled in the sleeve C, which forms part of the upper half of the hollow disk D, forming a head in which the gearing for increasing the speed of the spindle A, is arranged. A gear wheel E, is secured by a key $e$ to the lower end of the spindle B, and is designed to mesh with the pinion F, which is fixed to the end of the sleeve G by a key $f$.

H, is a washer fitted onto the sleeve G, and locked to the same by means of a key or otherwise.

I, is a gear wheel journaled on the sleeve G, so that it will revolve freely thereon, except when held in position by friction.

J, is a washer placed next to the wheel I, and held from revolving on the sleeve G, by means of a key or otherwise and leather gaskets are preferably placed between the washer H, and the wheel I, and between the washer J, and the same wheel but the said gaskets are not absolutely necessary.

K, is a nut screwed onto the end of the sleeve G, and it is by tightening this nut that the necessary friction to hold the gear wheel I, is produced. The gear wheel I, meshes with a pinion L, which is keyed to the spindle M, which spindle is provided with a drill chuck N, by which the small drills are held. The gearing between the spindle M, and the spindle B, is arranged so as to produce the necessary speed for the spindle M, the gear as before mentioned being held within the head D, which is held stationary by the rod X, or in any other suitable manner. The reason for holding the gear wheel I, by friction is to prevent the breaking of the small drill carried by the chuck N. If no provision were made by which the gearing could revolve without revolving the spindle M, breakages of the small drills would constantly occur.

The spindle M, is secured to the pinion L, either by a feather key or slot in the spindle M, working in connection with the gear formed inside the pinion L, in order that the spindle M, may be raised or lowered as required without affecting the gearing. The sleeve P, in which the spindle M, is journaled is inserted in the extensions Q, of the disk D, which has a rack R, formed on it, as shown.

S, is a pinion fixed to the small axle T, which pinion meshes with the rack R.

U, is a handle connected to the end of the axle T, and it is by this handle that the spindle M, is moved so as to operate the drill attached to its end.

V, is a coil spring carried in the box W. One end of the said spring is connected to the said box W, and the other end of the spring V, to the axle T, the spring V, being coiled so that its tension shall support the spindle M, when the said spring is not acted upon by pressure upon the handle V. In this way the normal position of the spindle M, is at its highest point and its movement downward for feeding the drill is caused by acting on the handle U, so as to revolve the axle T.

From this description it will be seen that I secure a device by which the smallest drill may be used in the largest drilling machines.

What I claim as my invention is—

1. In a drilling machine, a spindle B, a gear-wheel E fixed thereon, a gear-wheel F, meshing with said gear-wheel E and fixed to the shaft G, a gear-wheel I loosely held on said shaft G, a spindle M adapted to receive a chuck, and a gear-wheel fixed to said spindle M and meshing with said gear-wheel I, in combination with means for holding gear-wheel I to shaft G by friction, substantially as described.

2. In a drilling machine, a spindle B, a spindle M adapted to carry a chuck and geared to said spindle B by the gear-wheels E, F, I and L, a friction washer placed on each side of said gear-wheel I, and a nut K placed on the shaft thereof and adapted to regulate the amount of friction between said washers and gear-wheel, substantially as described.

Toronto, November 14, 1892.

JOHN J. STEVENS.

In presence of—
  A. M. NEFF,
  J. EDW. MAYBEE.